(12) United States Patent
Viorel et al.

(10) Patent No.: US 8,902,742 B2
(45) Date of Patent: Dec. 2, 2014

(54) METHOD AND SYSTEM FOR OPTIMIZED ACCESS OF A PHYSICAL RANDOM ACCESS CHANNEL

(71) Applicant: Fujitsu Limited, Kanagawa (JP)

(72) Inventors: Dorin Viorel, Calgary (CA); Chenxi Zhu, Fairfax, VA (US); Akira Ito, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 106 days.

(21) Appl. No.: 13/647,264

(22) Filed: Oct. 8, 2012

(65) Prior Publication Data

US 2014/0098660 A1    Apr. 10, 2014

(51) Int. Cl.
 *H04L 12/24*      (2006.01)
 *H04W 28/02*     (2009.01)
 *H04W 74/08*     (2009.01)
 *H04W 74/00*     (2009.01)

(52) U.S. Cl.
 CPC ........ *H04W 28/0205* (2013.01); *H04W 74/008* (2013.01); *H04W 74/0833* (2013.01)
 USPC .......................................................... 370/229

(58) Field of Classification Search
 CPC ............ H04W 74/0858; H04W 28/00; H04W 28/0284; H04W 28/0289; H04W 28/04; H04W 28/042; H04W 28/044; H04W 28/046; H04W 74/00; H04W 74/08; H04W 74/0833; H04W 74/0841; H04W 74/085; H04W 74/0866; H04W 74/0883; H04W 74/0891
 USPC ...................................................... 370/329
 See application file for complete search history.

(56) References Cited

U.S. PATENT DOCUMENTS

| | | | |
|---|---|---|---|
| 2002/0082032 A1* | 6/2002 | Hunzinger | 455/510 |
| 2011/0274040 A1* | 11/2011 | Pani et al. | 370/328 |
| 2013/0155994 A1* | 6/2013 | Yoshizawa et al. | 370/329 |
| 2014/0064110 A1* | 3/2014 | Viorel et al. | 370/252 |
| 2014/0064111 A1* | 3/2014 | Viorel et al. | 370/252 |

FOREIGN PATENT DOCUMENTS

| | | | | |
|---|---|---|---|---|
| WO | WO 2012/046507 | | 4/2012 | ............ H04W 74/08 |
| WO | WO 2012046507 A1 * | 4/2012 | | |
| WO | WO 2012129998 A1 * | 10/2012 | | |

OTHER PUBLICATIONS

International Search Report and Written Opinion; PCT/US2013/061797; pp. 18, Feb. 11, 2014.
Huawei; "Grouping of MTC Devices"; 3GPP TSG-RAN WG2 Meeting #73bis; Shanghai China; pp. 4, 2011.

* cited by examiner

*Primary Examiner* — Mark Rinehart
*Assistant Examiner* — Kenneth P Hunt
(74) *Attorney, Agent, or Firm* — Baker Botts L.L.P.

(57) ABSTRACT

A method for optimized access of a physical random access channel (PRACH) includes sampling a plurality of mapped zones associated with a base station. Each of the mapped zones has a plurality of endpoints. The method further includes determining a subset of disconnected endpoints in the given mapped zone where the disconnected endpoints are disconnected from a wireless network. The method also includes estimating a PRACH load based on the subset of disconnected endpoints. Additionally, based on whether the estimated PRACH load is a pre-determined factor larger than an original PRACH allocation, the method includes increasing the PRACH allocation to accommodate reconnection of the subset of disconnected endpoints in the given mapped zone.

18 Claims, 6 Drawing Sheets

METHOD AND SYSTEM FOR OPTIMIZED ACCESS OF A PHYSICAL RANDOM ACCESS CHANNEL

TECHNICAL FIELD

The present invention generally relates to network device support and, more particularly, to a method and system targeting cognitive loading of a physical random access channel.

BACKGROUND

Wireless communications systems are used in a variety of telecommunications systems, television, radio and other media systems, data communication networks, and other systems to convey information between remote points using wireless transmitters and wireless receivers. A transmitter is an electronic device that, usually with the aid of an antenna, propagates an electromagnetic signal modulated with information such as radio, television, or other signals. A receiver is an electronic device that receives a wireless electromagnetic signal and processes the information modulated thereon. A transmitter and receiver may be combined into a single device called a transceiver.

Machine to machine (M2M) communications are engineered to communicate with little or no human support. M2M communications in large industrial or machine residential networks may require the connection of over 30,000 machine User Equipment (UE) devices per cell. Long-Term Evolution (LTE) and/or Long-Term Evolution-Advanced (LTE-A) networks may be used as a fourth-generation (4G) wireless technology enabling communication between and/or among all UEs and a base station, e.g., Evolved Node B (eNB).

SUMMARY

In accordance with one or more embodiments of the present disclosure, a method for optimized access of a physical random access channel (PRACH) includes sampling a plurality of mapped zones associated with a base station. Each of the mapped zones has a plurality of endpoints. The method further includes determining a subset of disconnected endpoints in the given mapped zone where the disconnected endpoints are disconnected from a wireless network. The method also includes estimating a PRACH load based on the subset of disconnected endpoints. Additionally, based on whether the estimated PRACH load is a pre-determined factor larger than an original PRACH allocation, the method includes increasing the PRACH allocation to accommodate reconnection of the subset of disconnected endpoints in the given mapped zone.

In accordance with another embodiment of the present disclosure, one or more non-transitory computer-readable media embodying logic is provided that, when executed by a processor, is configured to perform operations including sampling a plurality of mapped zones associated with a base station where each mapped zone includes a plurality of endpoints. The logic further configured to determine a subset of disconnected endpoints in the given mapped zone where the disconnected endpoints are disconnected from a wireless network. The logic is additionally configured to estimate a PRACH load based on the subset of disconnected endpoints in the given mapped zone, and based on whether the estimated PRACH load is a pre-determined factor larger than an original PRACH allocation, increase the PRACH allocation to accommodate reconnection of the subset of disconnected endpoints in the given mapped zone.

In accordance with another embodiment of the present disclosure, a base station for wireless communication is provided comprising a memory and a processor coupled to a memory. The processor configured to sample a plurality of mapped zones associated with a base station. Each mapped zone has a plurality of endpoints. The processor is also configured to determine a subset of disconnected endpoints in the given mapped zone where the disconnected endpoints are disconnected from a wireless network. The processor is further configured to estimate a PRACH load based on the subset of disconnected endpoints in the given mapped zone, and based on whether the estimated PRACH load is a pre-determined factor larger than an original PRACH allocation, increase the PRACH allocation to accommodate reconnection of the subset of disconnected endpoints in the given mapped zone.

The object and advantages of the invention will be realized and attained by means of at least the features, elements, and combinations particularly pointed out in the claims. It is to be understood that both the foregoing general description and the following detailed description are exemplary and explanatory and are not restrictive of the invention, as claimed.

DETAILED DESCRIPTION

Embodiments of the present invention and its advantages are best understood by referring to FIGS. 1-6 of the drawings, like numerals being used for like and corresponding parts of the various drawings.

Figure 1:
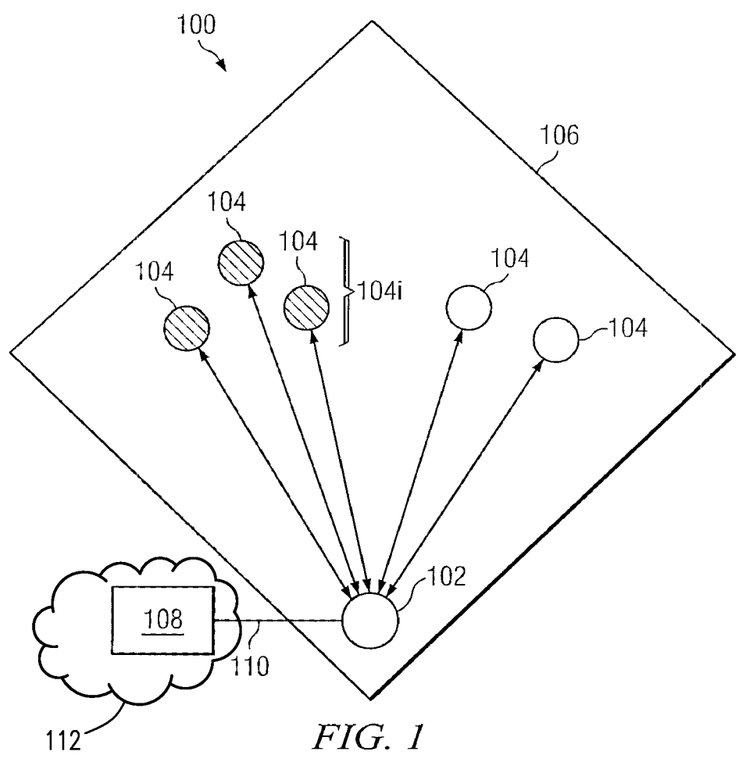
FIG. 1 illustrates a section of an example machine-to-machine (M2M) wireless network, in accordance with one embodiment of the present disclosure.

FIG. 1 illustrates an example machine-to-machine (M2M) wireless network 100, in accordance with one embodiment of the present disclosure. Network 100 may include one or more base stations 102 that communicate with one or more endpoints 104 via wireless communication methods. Network 100 may provide wireless coverage for any suitable number of endpoints 104 over a geographic area such as cell 106. For example, base station 102 may be used to provide wireless coverage for an entire building, a city block, a campus, or any other area. Cell 106 may have any suitable coverage shape, such as a diamond shape depicted in FIG. 1.

As used herein, base station 102 may refer to a transmission site, a remote transmission site, a Radio Element Control, an Evolved Node B (eNB), a Baseband Unit, a Radio Element, and/or a Remote Radio Head (RRH). Base station 102 may include any combination of hardware, software embedded in a computer readable medium, and/or encoded logic incorporated in hardware or otherwise stored (e.g., firmware) to implement any number of communication protocols that allow for wired or wireless exchange of information in network 100. Base station 102 may be operable to send control signals and data traffic to endpoints 104. Base station 102 may use any suitable technologies or protocols, e.g., Common Public Radio Interface (CPRI), to communicate with other base stations 102.

Base station 102 may also be coupled to any network or combination of networks capable of transmitting signals, data, and/or messages, including signals, data, or messages transmitted through WebPages, e-mail, text, chat, voice over IP (VoIP), and instant messaging in order to provide services and data to endpoints 104. For example, base station 102 may be coupled to one or more local area networks (LANs), wide area networks (WANs), metropolitan area networks (MANs), public switched telephone networks (PSTNs), worldwide interoperability for microwave access (WiMAX) networks, global distributed networks such as the Internet, or any other form of wireless or wired networking. As an example, base station 102 may be coupled to a core infrastructure network 112, which may include server 108, via a LAN 110.

Base station 102 may communicate with endpoints 104 using wireless communication via one or more ports (not expressly shown). Base station 102 may communicate with endpoints 104 using any suitable wireless technology, including, but not limited to, Long-Term Evolution (LTE) or Long-Term Evolution-Advanced (LTE-A) protocols. In some embodiments, base station 102 may coordinate with other base stations 102 to communicate jointly with endpoint 104.

Endpoint 104 may be any type of wireless device able to send and receive data and/or signals to and from other endpoints 104, base station 102 directly, and/or base station 102 via one or more other base stations 102. Some examples of endpoints 104 include desktop computers, PDAs, cell phones, laptops, VoIP phones, wireless measurement devices, wireless sensors, and/or Machine User Equipment (UE). Endpoints 104 may provide data or network services to a human and/or machine user through any suitable combination of hardware, software embedded in a computer readable medium, real-time processing system, and/or encoded logic incorporated in hardware or otherwise stored (e.g., firmware). Endpoints 104 may also include unattended or automated systems, gateways, other intermediate components or other devices that may send or receive data and/or signals. Various types of information may be sent to or from endpoints 104. As an example, endpoint 104 may send identification data and status data to base station 102.

Network 100 may have been initially designated for human use. However, M2M communications, also known as Machine Type Communications (MTC), may have emerged as market driven class of applications. M2M traffic patterns may be significantly different from human mobile traffic. During M2M mass event scenarios, (e.g., after a power outage scenario) impacting most or all endpoints 104 connected to base station 102, the related network 100 may be overloaded when the mass event resolves, e.g., power is returned. Additionally, network 100 may be unable to identify particular endpoints 104 that are involved in the mass event. In order to allow network 100 to properly process mass triggered machine events, last gasp function may be employed for some endpoints 104 as the capability of endpoints 104 to emit one last message when it loses power.

Further, network 100 and base station 102 may be required to accommodate large numbers of endpoints 104 in the form of machine UE devices, e.g., up to more than approximately 30,000 devices per cell 106. For example, sensor networks in industrial applications, smart grid/meters in residential utility applications, and/or smart home networks may include large numbers of endpoints 104. Network 100 may include only machine UE devices in the case of a M2M network, or network 100 may be a mix of human UE devices and machine UE devices in a human/machine network. During power outages or other mass event scenarios, endpoints 104i may be impacted and may lose power. Endpoints 104i may generate transmission of a last message, e.g., "last gasp" message (LGM), mass scale event triggered (MSET) device identification, and/or other signal. The LGM, MSET signaling, and/or other signal may be sent immediately after a power loss or other mass scale event. The LGM, MSET signaling, and/or other signal may be transmitted within a last gasp (LG) interval of approximately 50 ms to 500 ms immediately after the power outage or other mass scale event occurs, defined by the ability of a device to retain power, following a power failure. The LGM, MSET signaling, and/or other signal may include information indicating that the power outage or other mass scale event has occurred, e.g., that endpoint 104i has experienced a power loss or other mass scale event.

The LGM, MSET signaling, and/or other signal transmitted by endpoint 104 may be sent using a Random Access Channel (RACH) backed by a Physical Random Access Channel (PRACH). A PRACH may be a shared channel used for initial communication between endpoint 104 and base station 102 and for communication of unscheduled access related messages such as when endpoint 104 exits sleep mode, loses power, attempts to connect to the network, or executes a handover. Thus, for example, a PRACH may be used to transmit a LGM, MSET signaling, and/or other signal from endpoint 104 to base station 102 across and/or utilizing an LTE or LTE-A network. If endpoint 104 is unable to access PRACH following a power outage or other mass scale event, base station 102 may be unaware that a particular endpoint 104 is no longer connected to the network and possibly not operating. Additionally, when recovering from mass event scenarios involving large numbers of endpoints 104, the access channel including a RACH/PRACH may be overloaded (e.g., when power returns due to a large number of endpoints 104 attempting reconnection, which in turn will be attempting to contact base station 102 simultaneously). If the PRACH becomes overloaded when power is restored to endpoints 104, then signals sent from endpoints 104 attempting to reconnect to base station 102 may collide and some or most endpoints 104 may be unable to connect to network 100.

In some embodiments, predefined endpoints 104 may communicate and transmit signals to a primary endpoint 104, also called a "PRACH group candidate." The communication between predefined endpoints 104 and the PRACH group candidate may occur using a different wireless technology and/or network than the technology and/or network designed to communicate between endpoints 104 and base station 102. The PRACH group candidate may utilize the PRACH to communicate information regarding all predefined endpoints 104 to base station 102. While this "group access" may reduce traffic across the PRACH between endpoints 104 and base station 102, endpoints 104 may have a higher cost because they may be required to support multiple communication technologies, e.g., support for communication with the PRACH group candidate and communication with base station 102.

Figure 2:
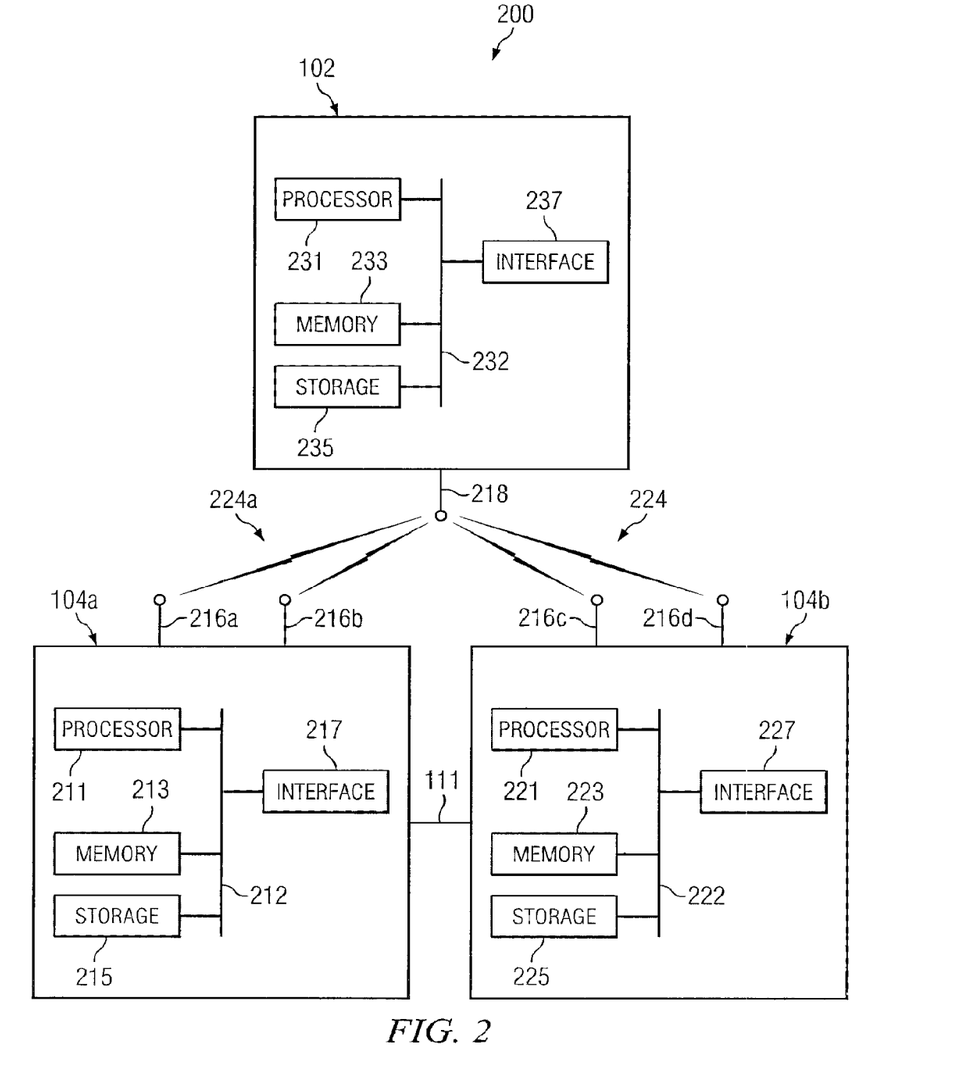
FIG. 2 illustrates example apparatuses that may facilitate the operations of various components of FIG. 1, in accordance with one embodiment of the present disclosure.

FIG. 2 illustrates example apparatuses that may facilitate the operations of various components of FIG. 1, in accordance with one embodiment of the present disclosure. FIG. 2 includes an example communications system 200 with two example endpoints 104 and example base station 102. Communications system 200 may correspond to at least a portion of network 100 of FIG. 1. Endpoints 104 and base station 102 may each include one or more portions of one or more computer systems.

System 200 may allow for multiple-input/multiple output (MIMO) transmission where multiple antennas are used for transmitting and receiving wireless signals. Additionally, system 200 may be configured to perform Coordinated Multipoint Processing (CoMP) to coordinate and combine the transmission of signals used in MIMO transmission. The CoMP processing may perform down link (DL) CoMP transmission in which multiple base units 102 jointly communicate with endpoints 104 and/or multiple endpoints 104 communicate with base unit 102.

Endpoints 104 may communicate with base station 102 using wireless communication via air interface using one or more antenna ports 216. For example, endpoint 104a may communicate with base station 102 via air interface using antenna ports 216a and 216b. Endpoint 104b may communicate with base station 102 via air interface using antenna ports 216c and 216d. Endpoints 104 may communicate with base station 102 using any of a variety of different wireless technologies, including, but not limited to, LTE, and LTE-A protocol as defined in the 3$^{rd}$ Generation Partnership Project (3GPP) Release 11 or beyond. In some embodiments of the present disclosure, endpoint 104a may coordinate with one or more other endpoints 104 to communicate jointly with base station 102. In such embodiments, endpoints 104 may coordinate with each other to communicate with base station 102 using a MIMO transmission scheme where multiple transmitting antenna ports 216 are placed at different endpoints 104, while one or more receiving antenna port 218 are located at the base station 102.

For example, endpoints 104 may communicate with base station 102 using a DL CoMP MIMO transmission as defined in 3GPP Release 11 or beyond. During such a MIMO transmission, endpoint 104 may wirelessly communicate a portion of a data stream to base station 102 via one or more wireless connections between antenna ports 216 and one or more antenna port 218 of base station 102.

The components of endpoints 104 and base station 102 may comprise any suitable physical form, configuration, number, type and/or layout. As an example, and not by way of limitation, endpoint 104 and/or base station 102 may comprise an embedded real-time processing system, computer system, a system-on-chip (SOC), a single-board computer system (SBC) (for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, endpoint 104 and/or base station 102 may include one or more computer systems; be unitary or distributed; span multiple locations; span multiple machines; or reside in a cloud, which may include one or more cloud components in one or more networks.

In the depicted embodiment, endpoints 104a and 104b and base station 102 each include their own respective processor 211, 221, and 231; memory 213, 223, and 233; storage 215, 225, and 235; interface 217, 227, and 237; and bus 212, 222, and 232. Although a particular wireless communications system is depicted having a particular number of particular components in a particular arrangement, this disclosure contemplates any suitable wireless communications system 200 having any suitable number of any suitable components in any suitable arrangement. For simplicity, similar components of endpoints 104 and base station 102 will be discussed together. However, it is not necessary for these devices to have the same components, or the same type of components. For example, processor 211 may be implemented as an application specific integrated circuit (ASIC) or chipset.

Processor 211, 221 and 231 may be a microprocessor, controller, or any other suitable computing device, resource, or combination of hardware, software and/or encoded logic operable to provide, either alone or in conjunction with other components (e.g., memory 213, 223, and 233, respectively), wireless networking functionality. Such functionality may include supporting various wireless features discussed herein. For example, processor 231 may be configured to analyze data and/or signals communicated between base station 102 and endpoints 104 via channels 224. Further, processor 211 and 221 of endpoints 104 may be configured to analyze signals and/or data communicated from base station 102 via channels 224.

In some embodiments, processor 211, 221, and 231 may include hardware for executing instructions, such as those making up a computer program. As an example, and not by way of limitation, to execute instructions, processor 211, 221, and 231 may retrieve (or fetch) instructions from an internal register, an internal cache, memory 213, 223, or 233, respectively, or storage 215, 225 or 235, respectively; decode and execute them; and then write one or more results to an internal register, an internal cache, memory 213, 223, or 233, respectively, or storage 215, 225, or 235, respectively.

In some embodiments, processor 211, 221, and 231 may include one or more internal caches for data, instructions, or addresses. This disclosure contemplates processor 211, 221, and 231 including any suitable number of any suitable internal caches, where appropriate. As an example, and not by way of limitation, processor 211, 221, and 231 may include one or more instruction caches, one or more data caches, and one or more translation lookaside buffers (TLBs). Instructions in the instruction caches may be copies of instructions in memory 213, 223, or 233, respectively, or storage 215, 225, or 235, respectively, and the instruction caches may speed up retrieval of those instructions by processor 211, 221, or 231, respectively. Data in the data caches may be copies of data in memory 213, 223, or 233, respectively, or storage 215, 225, or 235, respectively, for instructions executing at processor 211, 221, or 231, respectively, to operate on; the results of previous instructions executed at processor 211, 221, or 231 for access by subsequent instructions executing at processor 211, 221, or 231, or for writing to memory 213, 223, or 233, respectively, or storage 215, 225, or 235, respectively; or other suitable data. The data caches may speed up read or write operations by processor 211, 221, or 231. The TLBs may speed up virtual-address translations for processor 211, 221, or 231. In some embodiments, processor 211, 221, and 231 may include one or more internal registers for data, instructions, or addresses. Depending on the embodiment, processor 211, 221, and 231 may include any suitable number of any suitable internal registers, where appropriate. Where appropriate, processor 211, 221, and 231 may include one or more arithmetic logic units (ALUs); be a multi-core processor; include one or more processors 211; or any other suitable processor.

Memory 213, 223, or 233 may be any form of volatile or non-volatile memory including, without limitation, magnetic media, optical media, random access memory (RAM), read-only memory (ROM), flash memory, removable media, or any other suitable local or remote memory component or components. In some embodiments, memory 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213, 223, or 233 may include one or more memories 213, 223, or 233, respectively, where appropriate. Memory 213, 223, or 233 may store any suitable data or information utilized by endpoints 104 or base station 102, respectively, including software embedded in a computer readable medium, and/or encoded logic incorporated in hardware or otherwise stored (e.g., firmware). In some embodiments, memory 213, 223, or 233 may include main memory for storing instructions for processor 211, 221, or 231, respectively, to execute or data for processor 211, 221, or 231 to operate on. In some embodiments, one or more memory management units (MMUs) may reside between processor 211, 221, or 231 and memory 213, 223, or 233, respectively, and facilitate accesses to memory 213, 223, or 233 requested by processor 211, 221, or 231, respectively.

As an example, and not by way of limitation, endpoints 104 or base station 102 may load instructions from storage 215, 225, or 235, respectively, or another source (such as, for example, another computer system, another base station, or a remote transmission site) to memory 213, 223, or 233, respectively. Processor 211, 221, or 231 may then load the instructions from memory 213, 223, or 233, respectively, to an internal register or internal cache. To execute the instructions, processor 211, 221, or 231 may retrieve the instructions from the internal register or internal cache and decode them. During or after execution of the instructions, processor 211, 221, or 231 may write one or more results (which may be intermediate or final results) to the internal register or internal cache. Processor 211, 221, or 231 may then write one or more of those results to memory 213, 223, or 233, respectively. In some embodiments, processor 211, 221, or 231 may execute only instructions in one or more internal registers or internal caches or in memory 213, 223, or 233, respectively (as opposed to storage 215, 225, or 235, respectively, or elsewhere), and may operate only on data in one or more internal registers or internal caches or in memory 213, 223, or 233, respectively (as opposed to storage 215, 225, or 235, respectively, or elsewhere).

In some embodiments, storage 215, 225, or 235 may include mass storage for data or instructions. As an example, and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. Storage 215, 225, or 235 may be internal or external to transmission site 108, where appropriate. In some embodiments, storage 215, 225, or 235 may be non-volatile, solid-state memory. In some embodiments, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor 211, 221, or 231, respectively, and storage 215, 225, or 235, respectively, where appropriate.

In some embodiments, interface 217, 227, or 237 may include hardware, encoded software, or both providing one or more interfaces for communication (such as, for example, packet-based communication) between endpoints 104, base station 102, any networks, any network devices, and/or any other computer systems. As an example, and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments, interface 217 or 227 comprise one or more radios coupled to one or more antenna ports 216. In such an embodiment, interface 217 or 227 receives digital data that is to be sent out to wireless devices, such as base station 102, via a wireless connection. The radio may convert the digital data into a radio signal having the appropriate center frequency, bandwidth parameters, and transmission power. Similarly, the radios may convert radio signals received via one or more receiving antennas into digital data to be processed by, for example, processor 211 or 221, respectively. Interface 237 of base station 102 may be configured to perform similar operations via processor 231 and antenna port 218.

Depending on the embodiment, interface 217, 227, or 237 may be any type of interface suitable for any type of network for which communications system 200 is used. As an example, and not by way of limitation, communications system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communications system 200 may communicate with a wireless PAN (WPAN) (such as, for example, a BLUETOOTH WPAN), a WI-FI network, a WI-MAX network, an LTE network, an LTE-A network, a cellular telephone network (for example, a Global System for Mobile Communications (GSM) network), or any other suitable wireless network or a combination of two or more of these. Endpoints 104a and 104b, and base station 102 may include any suitable interface 217, 227, or 237, respectively, for any one or more of these networks, where appropriate.

In some embodiments, interface 217, 227, or 237 may include one or more interfaces for one or more I/O devices. One or more of these I/O devices may enable communication between a person and endpoints 104 and/or base station 102. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Some embodiments may include any suitable type and/or number of I/O devices and any suitable type and/or number of interface 217, 227, or 237 for them. Where appropriate, interface 217, 227, or 237 may include one or more drivers enabling processor 211, 221, or 231, respectively, to drive one or more of these I/O devices. Interface 217, 227, or 237 may include one or more interface 217, 227, or 237, respectively, where appropriate.

Bus 212, 222, or 232 may include any suitable combination of hardware, software embedded in a computer readable medium, and/or encoded logic incorporated in hardware or otherwise stored (e.g., firmware) to couple components of endpoint 104 and base station 102 to each other. As an example, and not by way of limitation, bus 212, 222, or 232 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of bus 212, 222, or 232, where appropriate. In some embodiments, one or more buses 212, 222, or 232 (which may each include an address bus and a data bus) may couple processor 211, 221, or 231, respectively, to memory 213, 223, or 233, respectively. Bus 212, 222, or 232 may include one or more memory buses, and may be specialized and dedicated multi-threaded busses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of processor 211, 221, or 231 (such as, for example, one or more internal registers or caches), one or more portions of memory 213, 223, or 233, one or more portions of storage 215, 225, or 235, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a higher-level programming language, such as, for example, C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), real time OS (RTOS), or other suitable markup language.

Accordingly, the above-mentioned components of endpoints 104 and base station 102 may enable endpoints 104 and base station 102 to perform operations such as joint data link transmission according to the present disclosure. Modifications, additions, or omissions may be made to FIG. 2 without departing from the scope of the present disclosure. For example, any of the options or features described herein may be utilized in combination with the illustrated embodiments of FIGS. 1 and 2 and/or any number of the other options or features also described herein as would be understood by one of ordinary skill in the art. As another example, base station 104 may include a real time physical (PHY) layer processor coupled to a fast access RAM and a permanent ROM memory. The real time PHY processor may be configured to process a plurality of signals stored into one or more subframes received from one or more endpoints 104.

In embodiments of the present disclosure, communications system 200 may be a wireless system that may support a M2M sensor network (e.g., a smart grid). The M2M network may have the characteristics of being fixed or portable such that some endpoints 104 may have no mobility attributes. The M2M network may be AC powered and may exhibit infrequent and/or bursty communication and traffic patterns. As signals are sent across air interface 224, the expected Time of Arrival (ToA) may be less than 5 seconds. As more endpoints 104 are added to a M2M network, a dedicated LTE or LTE-A network may be necessitated. When a mass scale triggered event (MSTE) occurs, e.g., power outage, many endpoints 104i may be disconnected from system 200.

As a consequence, base station 102 may employ a system and method to detect that endpoints 104i have experienced a MSTE and then further identify the number, location, and/or type of endpoints 104i affected by the MSTE in order to take any appropriate remedial steps. A power outage or other MSTE with a longer duration may allow base station 102 to identify more accurately aspects of endpoint 104i. A short duration of a mass event such a power outage may limit base station 102 identification of all aspects of endpoint 104i. Remedial steps taken by base station 102 may include preparing for recovery, rerouting signals, and/or any other appropriate remedial measure. Thus, as discussed in detail below and in embodiments of the present disclosure, a load cognitive PRACH algorithm may be employed including device identification and M2M PRACH access optimization upon recovery.

In some embodiments, following detection of an LGM, MSET, and/or other signal, the M2M network may further identify the affected devices utilizing the signal time and corresponding Time Advancing (TA) zones that may be based on the locations of the affected endpoints 104i. The selection of TA zones may depend on the power outage or other mass event duration. When the affected endpoints 104i may be ready to reconnect to the network, the network may schedule and perform a contention random access targeting procedure. In this procedure, the affected endpoint 104i may attempt to access the network and may be unsuccessful. If the affected endpoint 104i is unsuccessful, it may utilize a scheduled contention free opportunity.

Generally, M2M devices, e.g., endpoints 104, operating in a dedicated LTE M2M network may execute two types of access to an eNB, e.g., base station 102. A first type of access may be termed random access (RA) procedure including a random access channel (RACH) backed by a PRACH based access on the physical (PHY) layer. An RA procedure may be utilized when endpoint 104 connects to the base station 102.

Transmissions may include, for example, un-scheduled or scheduled transmissions of data, following the exit of idle or sleep mode, or powering on by a user, or after an accidental power failure. Thus, the RA procedure may target initial access, synchronization following idle/sleep mode, and/or handover (HO) procedures. Before the RA procedure begins, endpoints 104 may be in an initial status that may be either RRC_IDLE status, e.g., when endpoint 104 may be in sleep mode to conserve power, or NOT_CONNECTED status, e.g., when endpoint 104 may be powered down or removed from the network temporarily. Endpoints 104 subject to an RA procedure may migrate from either RRC_IDLE status or NOT_CONNECTED status to RRC_CONNECTED status, e.g., when endpoint 104 may be connected and/or transmitting information, from the LTE network perspective. When a device is subject to a power outage or other mass scale event, a PRACH access procedure may be triggered. Devices starting a PRACH access procedure may be in an RRC_IDLE state from a network perspective, but may have lost connectivity. In some embodiments, as endpoints 104 communicate with base station 102, 64 preamble signatures may be processed by base station 102 within one PRACH subframe.

Figure 3:
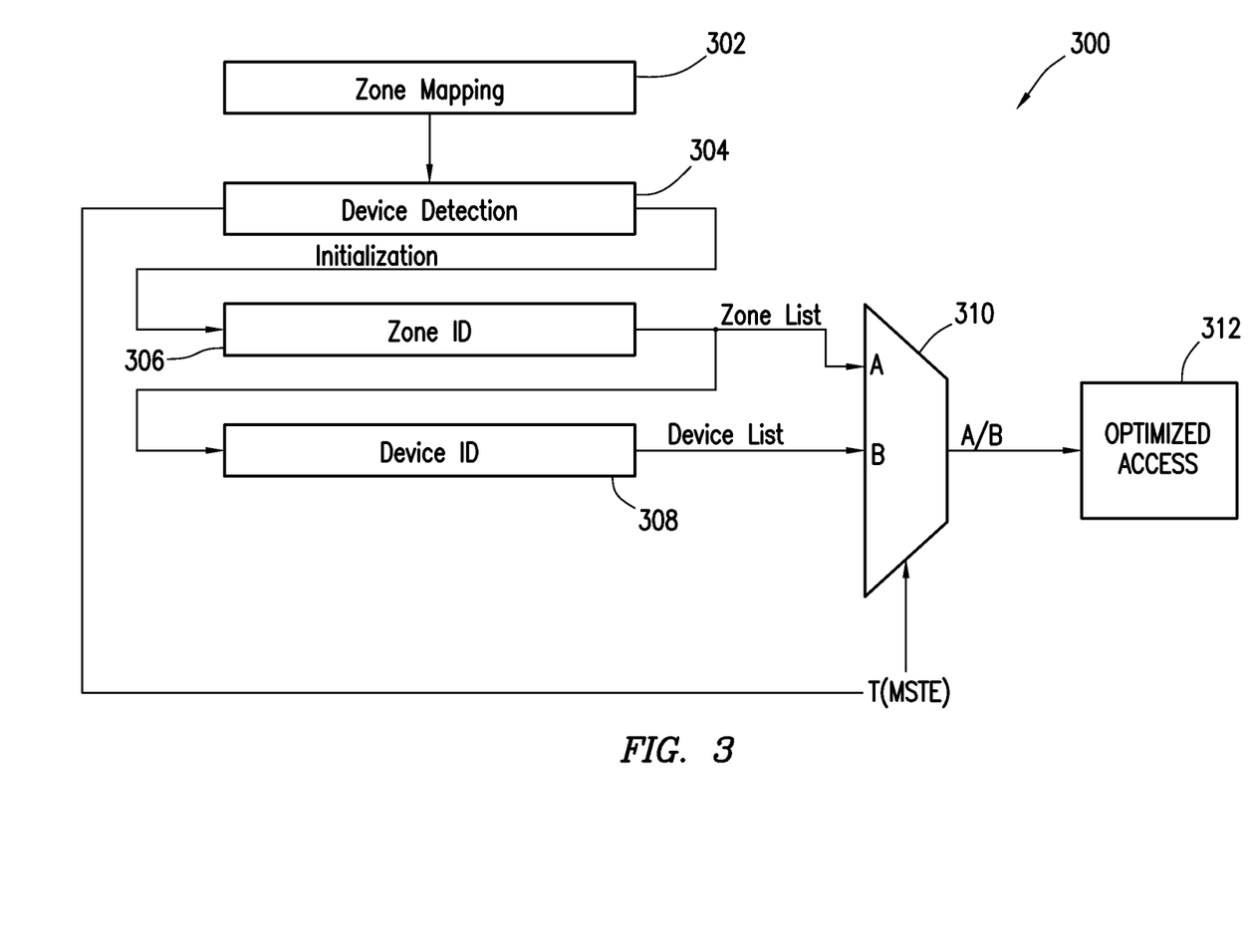
FIG. 3 illustrates the configuration and operation of a system to perform optimized access of one or more endpoints that have experienced a mass scale event affecting availability of the endpoints, in accordance with one embodiment of the present invention.

FIG. 3 illustrates the configuration and operation of system 300 to perform optimized access of one or more endpoints 104i that have experienced a mass scale event affecting availability of the endpoints 104i, in accordance with one embodiment of the present invention. Such a MSTE may include, for example, a widespread power outage. Given the large number of endpoints 104i that may have experienced the MSTE, endpoints 104i may have issued many LGMs, MSET signaling, and/or other signals. Base station 102 may have initially detected one or more LGMs, MSET signaling, and/or other signals but may have not subsequently received other LGMs, MSET signaling, and/or other signals. However, base station 102 may have measured increased collision rates over received PRACH from endpoints 104. Given the large number of potentially affected endpoints 104i, base station 102 may have been overloaded such that some LGMs, MSET, and/or other signals were not detected due to collisions over PRACH on the base station 102. Furthermore, some affected endpoints 104i may not have successfully sent an LGM, MSET, and/or other signal before the endpoint 104i was shut down. Thus, base station 102 may have received some LGMs, MSET signaling, and/or other signals but not all LGMs, MSET signaling, and/or other signals from all endpoints 104i that experienced the MSTE. Furthermore, as endpoints 104i recover from the MSTE and attempt to access network 100, base station 102 may be overloaded with requests. In addition, some entities, such as server 108, in communication with endpoints 104i may have need to know which endpoints experienced the mass scale event so as to take remedial measures. Such entities may require fast access to knowledge of which endpoints 104i have experienced the MSTE. Base station 102, server 108, or a combination of both may be configured to identify endpoints 104i that have experienced the MSTE to, for example, maximize or optimize the PRACH access of endpoints 104i as they come online, or to provide notification to interested entities such as server 108 about which endpoints 104i are offline. Although the following describes configuration of base station 102, such configuration may be performed fully or in part by server 108, though access of endpoints 104i by server 108 may be made through base station 102.

In one embodiment, base station 102 may include modules for zone mapping 302, device detection 304, zone identification 306, device identification 308, multiplexer 310, and optimized access 312. Such modules may be implemented in any suitable manner, such as in software, hardware, instructions, functions, applications, shared libraries, code sections, data structures, or any combination thereof.

In another embodiment, zone mapping 302, device detection 304, zone identification 306, device identification 308, multiplexer 310, and optimized access 312 may represent elements of a method for performing LGM device or MSET device identification. Such a method may be performed by various computer programs, models or any combination thereof, configured to simulate and design systems for last gasp detection. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, zone mapping 302, device detection 304, zone identification 306, device identification 308, multiplexer 310, and optimized access 312 may be described with respect to network 100 of FIG. 1; however, these may be used for optimized access procedure or MSET device identification in any suitable network.

Zone mapping 302 may be configured to enumerate endpoints, such as endpoints 104 in communication with base station 102. In order to track endpoints 104 that may be subject to a MSTE, base station 102 or other device may assign endpoints 104 to a zone in which such endpoints are located based on a time advancing (TA) parameter calculated by base station 102 for each connected endpoint 104. Zone mapping 302 may use an algorithm such as a TA Zone Mapping algorithm. The zone to which an endpoint may be assigned may include an ideal zone representation of the coverage area of base station 102. In one embodiment, endpoints 104 may be resident within a defined TA zone. In another embodiment, endpoints 104 may be relatively statically located, providing consistency of information with regards to the TA zone associated with a given endpoint 104. Zone mapping 302 may assign all endpoints 104 connected to base station 102 to specific zones positioned inside the geographical coverage of base station 102. Zone mapping 302 may use any suitable method or mechanism of identifying endpoints 104 as they are connected to network 100 and of identifying the associated TA zone. For example, zone mapping 302 may record the status update of an endpoint 104 that may change its location within the coverage of its base station 102 and/or record the logical status of endpoint 104 from a connection perspective, e.g., RRC_IDLE, RRC_CONNECTED, or any other suitable status. Zone mapping 302 may record the status in any suitable manner, such as in a database, file, or other data structure. Furthermore, zone mapping 302 may be based on the TA zone information employed by base station 102 in order to estimate the time advance of the subframes sent out by endpoint 104 in the coverage area. Zone mapping 302 may be updated on a regular basis as endpoints 104 TA zone information is updated by base station 102.

Figure 4:
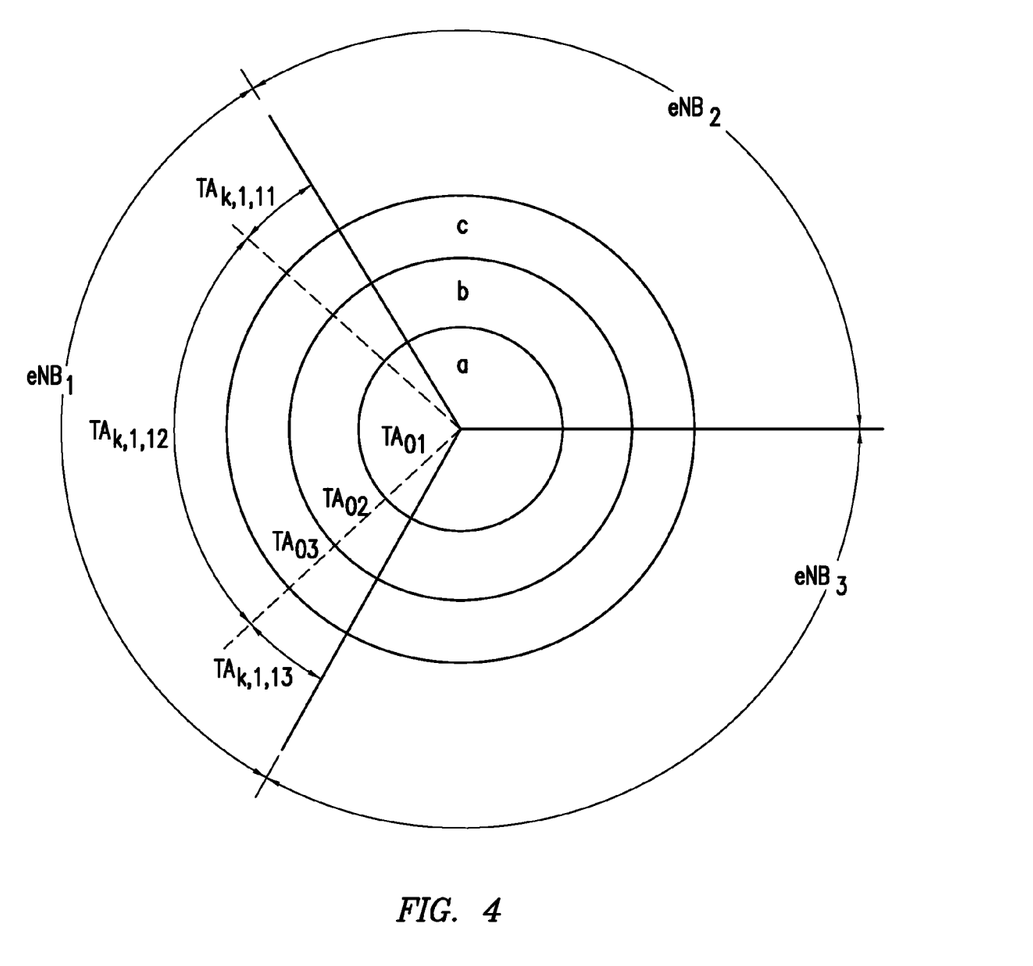
FIG. 4 is an illustration of an ideal time advancing (TA) zone mapping associated with a base station, in accordance with one embodiment of the present disclosure.

FIG. 4 is an illustration of an ideal TA zone mapping associated with, for example, base station 102, in accordance with one embodiment of the present disclosure. The 360° coverage area for co-located base stations 102 may be divided using any suitable arrangement. In one embodiment, the coverage are may be divided into three sectors related to three base stations, each covering 120° and denoted by $eNB_1$, eNB$_2$, and eNB$_3$. Furthermore, the coverage area of base station 102 may be divided into TA zones that reach progressively further from the center of the zone map. The zones may include, for example, TA$_{01}$, TA$_{02}$, and TA$_{03}$, which may be referred to as rows. Zone identification 306 may utilize the intersection of the sector and TA zone divisions to identify specific portions of the coverage map in which an endpoint 104 may reside. Furthermore, the range of TAs within a given circular sector may be divided into circular subsectors, such that a location may be specified by being adjacent sector (eNB$_1$, eNB$_2$, and eNB$_3$), row (TA$_{01}$, TA$_{02}$, and TA$_{03}$), and subsector within the row (a, b, c). In the example of FIG. 4, sector eNB$_1$, with rows TA$_{01}$, TA$_{02}$, and TA$_{03}$, may include subsectors 11, 12, and 13 (addressable by TA$_{k,1,11}$; TA$_{k,1,12}$; and TA$_{k,1,13}$) for each such row. The subsectors may be of variable angle width. Although FIG. 4 illustrates an example of a TA zone map for addressing the location or zone of endpoints 104, any suitable mapping may be used.

Base station 102 may build a dynamic database based on the average TA zone values per endpoint 104$i$. The database may have n rows where:

$$n = \left\lfloor \frac{R}{N_{TA} * c} \right\rfloor$$

where:
R=cell radius;
$N_{TA}=16*T_s$ (where $T_s$ is the sampling period); and
c=3E8 m/s (speed of light).
As example, for a 1 km diameter cell (R=0.5 km) and for a wireless system using $T_s$=32 ms, the number of concentric coverage sectors may be 3 (n=3). Base station 102 may assign each endpoint 104$i$ to the concentric coverage sectors shown in FIG. 4. The supporting dynamic database may be constructed by base station 102 or other device for a TA subsection as follows:

$$TA_{k,l} = \begin{bmatrix} MU_{0,0} & MU_{1,0} & & MU_{m-1,0} \\ MU_{0,n-2} & & & MU_{m-1,n-2} \\ MU_{0,n-1} & MU1,n-1 & & MU_{m-1,n-1} \end{bmatrix}$$

where:
MU=each endpoint
m=max allowed endpoint per cell
n=number of TA zones (represented as concentric circles in FIG. 4) per cell In the case in which all endpoints 104 are located within one TA zone (e.g., TA$_k$) all endpoints 104 placed on rows different from k may have null values. TA$_{k,1}$ may represent the subsection dynamic database built and maintained by eNB$_{k,1}$, or equivalent functional network server, or other suitable device. For each eNB$_{k,1}$, eNB$_{k,2}$, and eNB$_{k,3}$, subsection a similar matrix may be generated. The subsection matrices may be combined to generate a full database of all endpoints 104$i$ associated with each TA zone and may account for duplicate detection of endpoint 104$i$ located at borders between TA zones. For example, $$|TA_{k,1}| = TA_{k,11} + |TA_{k,12}| + |TA_{k,13}|$$

where:
|TA$_{k,11}$| is the matrix (data base) of {M2M_UE}∈eNB$_{k,1}$ able to detect co-located eNB$_{k,2}$;

|TA$_{k,13}$| is the matrix (data base) of {M2M_UE}∈eNB$_{k,1}$ able to detect co-located eNB$_{k,3}$; and

|TA$_{k,12}$| is the matrix (data base) of {M2M_UE}∈eNB$_{k,1}$ which do not detect co-located eNB$_{k,2}$ and eNB$_{k,2}$ (center subsection as represented in FIG. 4).

Matrices |TA$_{k,12}$|, |TA$_{k,13}$| and |TA$_{k,11}$| may have the same size (n,m). |TA$_{k,11}$|, |TA$_{k,13}$| may be padded with zeroes for non-detected endpoints 104$i$ (related to the co-located eNBs) such that a non-zero MU$_{n,m}$ element may be identified in only one of the matrices |TA$_{k,12}$|, |TA$_{k,13}$| and |TA$_{k,11}$| at a given moment (the other two matrices having a value of zero).

Returning to FIG. 3, device detection 304 may be configured to determine that one or more LGM or MSET devices have been detected and identified. In one embodiment, device detection 304 may be configured to determine whether a mass event, such as a power failure, has occurred based on received LGMs, MSET signaling, and/or other signals. Device detection 304 may provide a flag or other indication that a mass event has occurred. Device detection 304 may be implemented in any suitable method or mechanism such as by comparing LGMs, MSET signaling, and/or other signals received or determining that a threshold rate or number of collisions has been detected. In addition, device detection 304 may determine how long the mass event has lasted. For example, device detection 304 may be configured to determine the duration of a power outage affecting endpoints 104$i$. In one embodiment, device detection 304 may be configured to update continuously such a duration. In another embodiment, device detection 304 may be configured to report such a duration upon conclusion of the mass event. In yet another embodiment, device detection 304 may provide a flag or other indicator that the mass event may be occurring or has concluded. Device detection 304 may be configured to monitor continuously for arriving LGMs, MSET signaling, and/or other signals from endpoints 104$i$.

Device detection 304 may be configured to include a response to an attempted PRACH access from endpoint 104$i$. For example, base station 102 may respond to endpoint 104$i$ with response that may include a Random Access Response (RAR). The RAR may include L1 (or physical (PHY) layer) and Level 2 (L2) signaling, e.g., an L1/L2 signal. If the transmission from endpoint 104$i$ may not be properly decoded by base station 102 due to PRACH collisions, base station 102 may transmit a negative RAR, also possibly indicating a back-off indicator (BI) for endpoint 104. A negative RAR may indicate to endpoint 104 to wait and reattempt access later. The BI may include a parameter indicating the time delay before endpoint 104 may send an additional PRACH transmission. Thus, after a preselected or scheduled passage of time, e.g., the BI time, endpoint 104 may reattempt access.

Device detection 304 may be configured to output information in any suitable manner. In one embodiment, device detection 304 may be configured to provide notification of a mass event upon conclusion of receiving multiple LGMs, MSET signaling, and/or other signals. In another embodiment, after device detection 304 has detected a mass event and additional LGMs, MSET signaling, and/or other signals arrive, device detection 304 may be configured to notify other modules to reevaluate analysis conducted thus far. Device detection 304 may be configured to store information regarding endpoints 104$i$ in any suitable manner, such as in a file, database, or data structure that may be shared with other modules.

In one embodiment, device detection 304 may be configured to perform mass event duration control and monitoring. For example, given a mass event such as a power outage, device detection 304 may be configured to determine whether the power outage is ongoing or how long the power outage lasted. Device detection 304 may be configured to provide such information to, for example, multiplexer 310. Such a determination may be represented by T(MSET).

Zone identification 306 may be configured to estimate which zones, such as TA zones, associated with endpoints 104 are affected by the mass event. In one embodiment, zone identification 306 may be based upon received LGMs, MSET signaling, and/or other signals from endpoints 104$i$. However, LGMs, MSET signaling, and/or other signals may be issued by endpoints 104$i$ from a given zone but may not be received by base station 102. Thus, in another embodiment zone identification 306 may be initialized by received LGMs, MSET signaling, and/or other signals and then subsequently followed by the identification of the endpoints 104$i$ located in the entire coverage area for base station 102. If some zones contained no endpoints 104$i$, as identified in zone mapping 302, then zone identification may be skipped for such zones. Upon completion of zone identification 306, an identification of zones impacted by the mass event may be available. Zone identification 306 may be completed in a shorter amount of time than individually polling or sampling every endpoint 104$i$ identified in zone mapping 302 to determine whether such endpoint is connected or whether it has turned off in response to the mass event.

Figure 5:
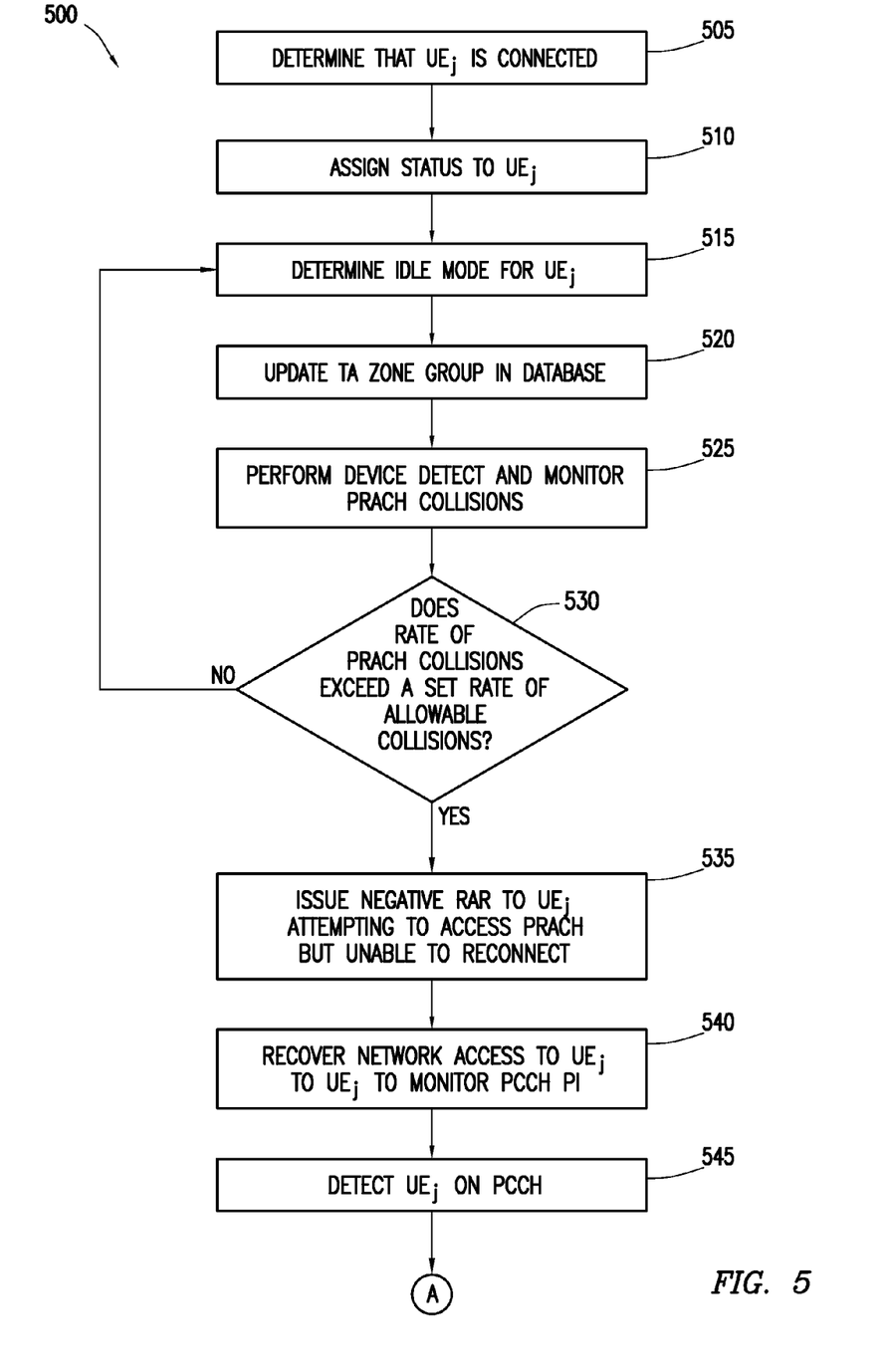
FIGS. 5 and 6 illustrate methods for performing zone identification and PRACH load monitoring, in accordance with some embodiments of the present disclosure.

Zone identification 306 may be configured to perform in any suitable manner, such as in the steps illustrated in and in conjunction with FIG. 5. In one embodiment, zone identification 306 may be configured to sample known endpoints 104 within a given zone. The known endpoints 104 within a given zone from which zone identification 306 may sample may have been determined by zone mapping 302. Such sampling may include polling a given endpoint 104 to determine whether it has turned off while it was expected to be in RRC_IDLE status. In a further embodiment, zone identification 306 may sample subsections of a given zone. In yet another further embodiment, zone identification 306 may apply sampling weights to the sampling of zones or zone subsections. The weight may be based on, for example, relative size of the zone or zone subsection, or upon received LGMs, MSET signaling, and/or other signals from a given zone or subzone.

Zone identification 306 may be configured to output information related to zone sampling in any suitable manner. Zone identification 306 may output a listing of zones or zone subsections associated with base station 102 that include endpoints 104 that are non-responsive. Furthermore, zone identification 306 may output a list of zones or zone subsections from which LGMs, MSET signaling, and/or other signals were received. Zone identification 306 may be configured to store the results of its analysis in any suitable manner for use by other entities, such as in a database, file, or other data structure.

Device identification 308 may be configured to individually poll or contact endpoints 104 identified in enumeration 304 as connected to system 100. Device identification 308 may be performed in any suitable manner following collisions measured over PRACH. In one embodiment, device identification 308 may be performed upon completion of zone identification 306. In another embodiment, device identification 308 may be performed in parallel with zone identification 306, dependent upon the available resources of base station 102. Device identification 308 may require significantly longer operation than zone identification 306. Device identification 308 may require a longer time to fully page or poll all endpoints 104 than the time of a mass event itself. By polling each endpoint 104, device identification 308 may be more accurate in identifying endpoints 104$i$ associated with the mass event than zone identification 306.

Device identification 308 may be configured to time its operation. In one embodiment, device identification 308 may be configured to keep a running total of the time used in execution. In another embodiment, device identification 308 may be configured to estimate the total time necessary to execute the polling of all endpoints 104, based on the number of endpoints 104 known through enumeration. If a mass event, such as a power outage, has terminated before completion of device identification 308, then device identification 308 may be configured to stop operation and output the analysis results, as determined by zone identification 306, to optimized access 312.

Device identification 308 may be configured to output its results in any suitable manner, such as with a database, file, record, or data structure. Device identification 308 may indicate which of endpoints 104 are connected and which of endpoints 104 previously known as connected (including RRC_IDLE status devices) are non-responsive. In one embodiment, device identification 308 may be configured to output partial results of polling endpoints 104 upon termination of the mass event. In another embodiment, device identification 308 may be configured to only output full results of polling endpoints 104. Device identification 308 may be configured to poll endpoints 104 in an order, priority, or selective basis based upon the results of zone identification 306. For example, device identification 308 may prioritize polling of endpoints in zones identified as experiencing the mass event.

In one embodiment, device identification 308 may be performed wholly or in part by base station 102, or other device designated to provide this functionality. In another embodiment, device identification 308 may be performed wholly or in part by server 108.

Multiplexer 310 may be configured to select from results of zone identification 306 and device identification 308 to output to waiting entities, such as optimized access 312 or server 108, which may use the information to take corrective action in response to the mass event. Multiplexer 310 may make such a selection using any suitable criteria. Multiplexer may take into account the time spent or to be spent on each of zone identification 306 and device identification 308, as well as the length of the MSTE or device detection 304. Multiplexer 310 may receive information concerning the status of a mass event (such as a power outage) from a suitable entity, such as device detection 304, that a mass event has terminated. Such an indication may be denoted as, for example, T(MSTE). Time required or elapsed for operation of device identification 308 may be indicated as, for example, T(DEVICE_ID). Time required or elapsed for operation of zone identification 306 may be indicated as, for example, T(ZONE_ID).

In one embodiment, multiplexer 310 may determine whether device identification 308 has completed or will be completed by the time the mass event is complete. If device identification 308 has not completed, then multiplexer 310 may select the output of zone identification 306 to pass to entities such as optimized access 312. If device identification 308 has completed, then multiplexer 310 may select the output of device identification 308 to pass to entities such as optimized access 312. In another embodiment, if the mass event is not over, multiplexer 310 may output interim results from device identification 308 or zone identification 306. In yet another embodiment, if neither device identification 308 nor zone identification 306 has been completed, multiplexer 310 may output a null signal. In an additional embodiment, if the mass event has not terminated, multiplexer 310 may output a partial set of results as output by zone identification 306 with an associated incomplete procedure flag.

Optimized access 312 may be configured to take any suitable remedial steps. Such steps may include remedial steps to be taken by base station 102 or server 108 to correct problems created by the mass event or to efficiently reconnect endpoints 104i to system 100. Optimized access 312, which may present an orderly PRACH (contention-free) procedure with reduced or no collisions, may be performed wholly or in part by, for example, base station 102 or server 108.

In operation, zone mapping 302 may identify endpoints 104 as they are connected to system 100. Zone mapping 302 may identify a location or area, such as a TA zone, associated with each endpoint 104 and store the information. Zone mapping 302 may repeat such actions on a regular basis, in order to update zone mapping databases as endpoints 104 may be connected and disconnected from network 100. The updating refresh rate may depend on the total number of endpoints 104 connected to respective base station 102 and/or may be determined by a user. Device detection 304 may be triggered, in one embodiment, by an increased measured collision rate over PRACH, thus determining that a mass event has occurred. Zone identification 306 may use the determinations of device detection 304 to inform a sampling of zones in which endpoints 104 were residing as they were connected to system 100. The sampling may include polling or paging a subset of endpoints 104 recorded as resident within a given zone. Zone identification 306 may determine which zones have unresponsive endpoints 104 and determine that such endpoints are associated with the mass event. Sequentially or in parallel with such operations of zone identification 306, device identification 308 may poll or otherwise contact each endpoint 104 enumerated by zone mapping 302 to determine whether the endpoint is connected to system 100 or not.

Multiplexer 310 may monitor whether the mass event has ended. Based on the time of the mass event, the time to conduct zone identification 306, and the time to conduct device identification 308, multiplexer 310 may selectively choose the output of zone identification 306 or device identification 308 to describe which of endpoints 104 experienced the mass event and may have issued an LGM, MSET signaling, and/or other signal. Such an LGM, MSET signaling, and/or other signal may or may not have been received by base station 102. Multiplexer 310 may provide the selected output to an entity that may take remedial action, such as optimized access 312 or server 108.

Figure 6:
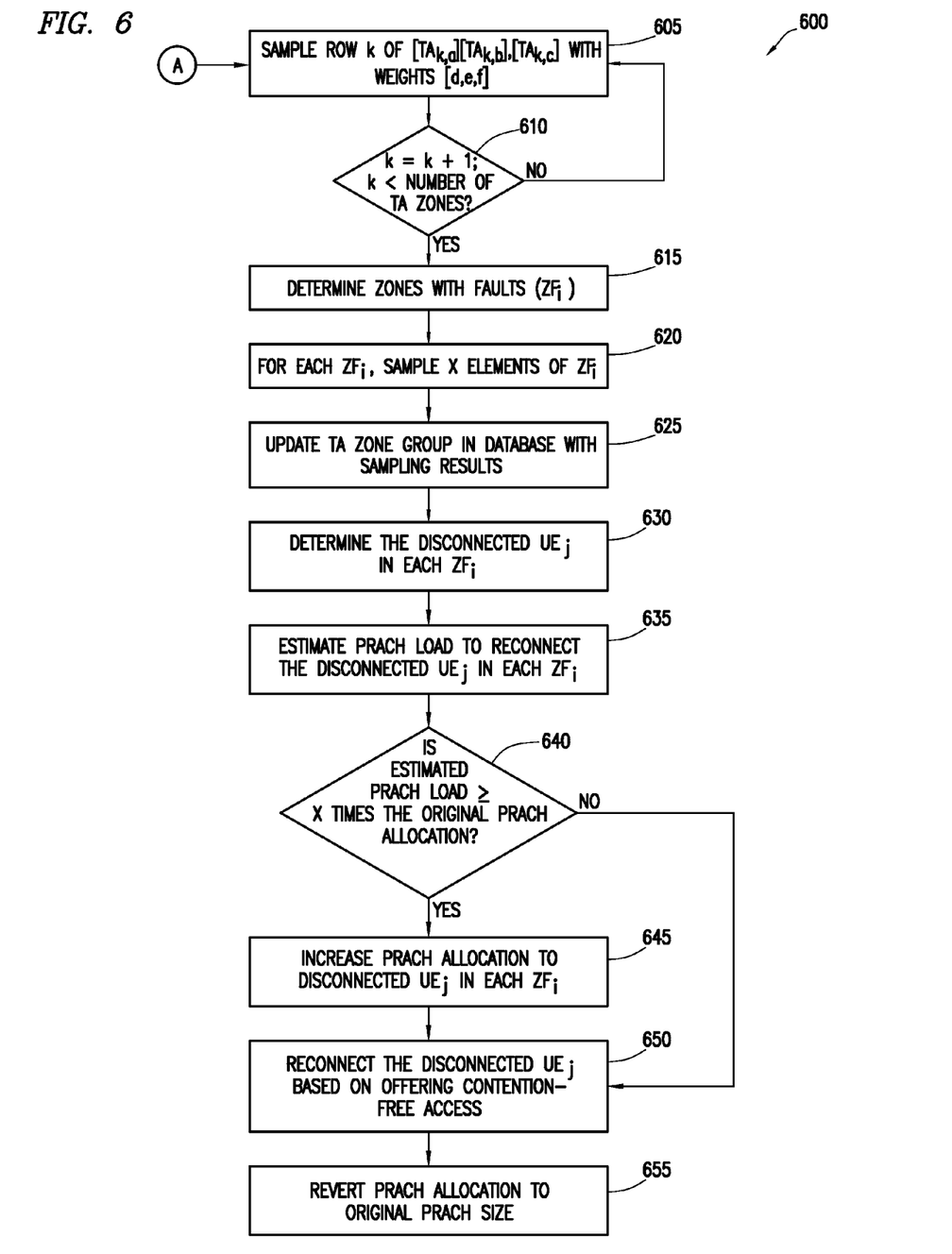

FIGS. 5 and 6 illustrate methods 500 and 600 for performing zone identification and PRACH load monitoring, in accordance with some embodiments of the present disclosure. Methods 500 and 600 may implement fully or in part zone identification 306 and optimized access 312 of FIG. 3. The steps of methods 500 and 600 may be performed by various computer programs, models or any combination thereof, configured to simulate and design systems for zone identification and optimized access utilizing PRACH load monitoring. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, methods 500 and 600 are described with respect to network 100 of FIG. 1; however, methods 500 and 600 may be used for zone identification and optimized access on any suitable network.

Methods 500 and 600 may be performed in association with a base station, such as base station 102 of FIG. 1. Methods 500 and 600 may be performed separately, repeated or performed in parallel for each one of the co-located base stations, using a sectorization as illustrated in FIG. 4. Each such sector may correspond to a given base station.

At step 505, endpoints (each designated as $UE_j$) may be activated and connected to a wireless system such as system 100. At step 510, the status for each endpoint may be assigned as connected, and at step 515, the status of each such endpoint may be assigned as idle mode in order to optimized endpoint 104 power consumption. At step 520, it may be determined that an entry for TA zone tracking may be created for the endpoint, along with a determination of the TA zone in which the endpoint resides. For a given zone, the endpoints determined to be connected may be grouped into a TA zone group. The TA zones may be created, in one embodiment, based on the TA information processed by base station 102 for each one of the connected endpoints. A real-time record of endpoints 104 may be stored into a database, file, or other suitable entity. In one embodiment, endpoint 104 may include a mobile device that moves from one base station 102 and/or zone to another. In such a case, step 520 may be repeated to update the location of the endpoint. In another embodiment, the endpoint may include a fixed point as part of an M2M network. Steps 505, 510, 515, and 520 may be implemented fully or in part by zone mapping 302 of FIG. 3.

At step 525, a mass event may be detected and device detection may be performed. The mass event may be detected, for example, as a result of increased PRACH collisions. Such a mass event may include reception of LGMs, MSET signaling, and/or other signals. Step 525 may be implemented fully or in part by device detection 304 of FIG. 3. Step 525 may be repeated as additional LGMs, MSET signaling, and/or other signals are received, causing a repeat of subsequent actions of method 500.

At step 530, base station 102 may determine if the rate of PRACH collisions, defined as $P_{coll}$, exceeds a predefined allowable rate of collisions, defined as $k\sigma$. Thus, base station 102 may determine' $P_{coll} > k\sigma$, where k is a parameter that may be determined experimentally and introduced in order to avoid sudden starts and/or stops of steps in method 500. If the rate of PRACH collisions exceeds the predefined allowable rate of collisions, then a mass group event or MSET may have occurred and method 500 may proceed to step 535. If the rate of PRACH collisions does not exceed the predefined allowable rate of collisions, then a power outage or other mass scale event may not have occurred and method 500 may return to step 515.

At step 535, a negative RAR may be issued to endpoints 104i that are attempting to access PRACH but unable to reconnect due to collisions. For a limited number of times, endpoint 104i may attempt to access PRACH following a random BI associated with the negative RAR. After the limited number of unsuccessful attempts to reconnect, endpoint 104i may switch to synchronize on the last base station 102 to which it was connected. For example, after three failed attempts to connect endpoint 104 may switch to tracking the primary synchronization signal (PSS) and secondary synchronization signal (SSS) of base station 102. The PSS/SSS may include PHY layer signals that allow endpoint 104 to synchronize in time and frequency with base station 102.

Thus, endpoint 104i may have synchronized using the PSS/SSS following multiple attempts to reconnect and reception of negative RAR signals.

At step 540, network access may be recovered for endpoint 104i and endpoint 104i may monitor a paging control channel (PCCH) paging indicator (PI). For example, endpoint 104i may attempt to connect with base station 102 and may not successfully connect. If endpoint 104i does not successfully connect, it may not receive a positive RAR. Instead, endpoint 104i may receive a negative RAR or a BI. Following multiple attempts to reconnect and depending on implementation and/or design characteristics, a "locked out," or unable to reconnect endpoint 104 may attempt to synchronize with the PSS/SSS and monitor a PCCH PI to determine when to reattempt PRACH access. With a successful PSS/SSS lock, endpoint 104i may search, identify, and listen to PCCH PI, which may indicate to endpoint 104i the appropriate time to attempt reconnection. Method 500 may proceed to step 545. At step 545, endpoints 104i that are monitoring the PCCH PI and were previously subject to the mass scale event may be detected by the base station 102 and scheduled for contention-free (orderly) access as discussed in step 650 with reference to FIG. 6. Method 500 may transition to step 605 of method 600 shown on FIG. 6. The transition may include that endpoints 104, after detecting a PCCH PI and scheduled for contention-free access, may reconnect at step 650 as presenting in FIG. 6. Furthermore, the transition may include that base station 102 may initiate step 605 as presented in FIG. 6 after detecting a sustained increased collision rate as described in conjunction with step 530 above.

In step 605, the circular subsections—such as a, b, and c—of a row k of TA zones may be sampled. Step 605 may execute partially or fully zone ID 306 shown with reference to FIG. 3. Such sampling may include polling a subset of the endpoints recorded as resident within the subsection to determine whether a given endpoint is not connected. The sampling may be assigned weights (e.g., stratified sampling), such as d, e, and f, for each subsection. The weights, which may be determined experimentally based in part on the size of subsection of each TA sector, may be used to increase or decrease sampling based on, for example, radial or angular size of the subsection, or previously received LGM or other signal rate from various subsections. Any disconnected endpoints 104i affected by the MSTE from the samples may be recorded as associated with the sector, TA, and subsection.

In step 610, the row k may be incremented. If the row number k is still within the number of maximum TA zones m, then step 605 may increment the row number k. Otherwise, method 600 may proceed to step 615.

At step 615, sectors, TA zones, or subsections associated with disconnected endpoints, and thus possibly the mass event, may be reported as ZFi. Step 615 may execute partially or fully zone ID 306 shown with reference to FIG. 3. Such sectors, TA zones, or subsections may be used to conduct remedial action, if such information is reported by, for example, multiplexer 310 of FIG. 3. Method 600 may proceed to step 620.

At step 620, additional sampling may be performed upon ZFi to provide additional information regarding the mass event. For each ZFi, x samples may be taken. Such samples may resemble the operation of step 615, wherein x number of endpoints known to have resided with the sector, TA zone, or subsection may be polled to determine whether the endpoints are connected or not. The results may be used to construct a TA zone list in step 625, indicating sectors, TA zones, or subsections possibly affected by the mass event and, further, to what degree such a sector, TA zone, or subsection is affected. The zone list may be a modified version of the TA zone group determined in step 520 shown on FIG. 5. The zone list may be stored in a database, file, or other suitable entity. In order to increase the accuracy of the TA zone identification, steps 605, 610, 615, 620, and 625 may be repeated until a desired device identification per zone has been achieved. Method 600 may proceed to step 630.

At step 630, base station 102 may determine the disconnected endpoints 104i in each TA zone or subsection associated with disconnected endpoints 104i. In some embodiments, endpoints 104i may be essentially stationary, and thus, the TA zones with failures may indicate the approximate location of the mass event. Step 630 may utilize the matrices discussed with reference to FIG. 4. For example, base station 102 may determine zones with faults ($ZF_i$) at step 615 and sample X elements of $ZF_i$ at step 620. In some embodiments, the sampling results may indicate the disconnected endpoints 104i and the corresponding TA zones ($ZF_i$) that may have the largest amount of disconnected endpoints 104i. As discussed below with respect to step 650, prioritizing reconnection of the disconnected endpoints 104i may be based on TA zones $ZF_i$ that have the largest amount of disconnected endpoints 104i. Method 600 may proceed to step 635.

At step 635, base station 102 may estimate the PRACH load that may be necessary to reconnect each of the disconnected $UE_j$ for a given TA zone $ZF_i$. At step 640, base station 102 may determine if the estimated PRACH load for a given TA zone $ZF_i$ is greater than or equal to a pre-determined factor (X) times the original PRACH allocation to reconnections. The value of the pre-determined factor (X) may be equal to a load of a known Slotted Aloha (S-Aloha) access function. A S-Aloha access function may be an access function in which data, or packets, may be sent at the beginning of a fixed transmission time, or slot. The pre-determined factor (X) may be the load G of the access function. The value of X may cause a resizing of PRACH in order to accommodate all detected endpoints 104i in step 630 and offering contention free reconnections.

If it is determined that the estimated PRACH load for a given TA zone $ZF_i$ is greater than or equal to the pre-determined factor (X) times the original PRACH allocation to the given TA zone $ZF_i$, method 600 may proceed to step 645 and base station 102 may increase the PRACH allocation to reconnection of the disconnected endpoints 104i in a given TA zone $ZF_i$. In one embodiment, the pre-determined factor X to increase PRACH size may be one, e.g., G=1, known as the maximum S-Aloha access function for the given subscriber population waiting for access. For example, base station 102 may increase PRACH allocation to approximately 50% of the available preamble signatures in a particular frame to reconnection of the disconnected endpoints 104i in a given TA zone $ZF_i$. This allocation may provide the disconnected endpoints 104i in a given TA zone $ZF_i$ contention free access to reconnect. As example, base station 102 may allocate approximately thirty-two of the available PRACH preamble signatures of a particular subframe to reconnection (contention free random access) of the disconnected endpoints 104i in a given TA zone $ZF_i$. The remaining signatures of the particular frame may continue to be allocated to regular (contention) PRACH access for endpoints 104 attempting regular access. Base station 102 may assign all disconnected endpoints 104i in a given TA zone $ZF_i$ to the PRACH allocation designated for contention free reconnections. Following increase of the PRACH allocation, method 600 may proceed to step 650. Additionally, if at step 640 the estimated PRACH load is less than the pre-determined factor (X) times the original PRACH allocation, method 600 may proceed to step 650.

At step 650, base station 102 may reconnect the disconnected endpoints 104i in a given TA zone $ZF_i$ based on allocating contention free access to each endpoints 104i in a given TA zone $ZF_i$ and/or other orderly method for reconnection that offers reduced or no collisions. Contention free access may be assisted by the utilization of a PSS/SSS of base station 102. As noted previously with reference to step 540 illustrated on FIG. 5, the PSS/SSS may include PHY layer signals that allow endpoints 104i to synchronize with base station 102. Endpoints 104i may have synchronized with the PSS/SSS following multiple attempts to reconnect and reception of negative RAR signals. Following multiple attempts to reconnect and depending on implementation and/or design characteristics, a "locked out" endpoints 104i may attempt to synchronize with the PSS/SSS and monitor a PCCH PI to determine when to reattempt PRACH access. The PCCH PI may indicate to endpoints 104i the appropriate time to attempt reconnection. At step 655, base station 102 may revert the PRACH allocation for contention free access and reconnections to the original PRACH size.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A method for access of a physical random access channel (PRACH) comprising:
    sampling a plurality of endpoints included in a plurality of mapped zones associated with a base station, wherein sampling the plurality of endpoints includes polling a subset of the plurality of endpoints; and
    for each mapped zone of the plurality of mapped zones:
        determining a subset of disconnected endpoints, the disconnected endpoints being disconnected from a wireless network;
        estimating a PRACH load based on the subset of disconnected endpoints; and
        based on whether the estimated PRACH load is a pre-determined factor larger than an original PRACH allocation, increasing a PRACH allocation for accommodating reconnection of the subset of disconnected endpoints.

2. The method of claim 1, further comprising, for each mapped zone of the plurality of mapped zones:
    reconnecting the subset of disconnected endpoints; and
    reverting the PRACH allocation to the original PRACH allocation.

3. The method of claim 1, wherein the mapped zones include time advancing zones.

4. The method of claim 1, wherein the subset of disconnected endpoints is determined based at least in part on a primary synchronization signal and a secondary synchronization signal.

5. The method of claim 1, wherein the PRACH allocation for accommodating reconnection of the subset of disconnected endpoints is based on a percentage of available PRACH preamble signatures.

6. The method of claim 1, further comprising:
    determining the subset of disconnected endpoints in a plurality of the mapped zones; and
    prioritizing the reconnection of the subset of disconnected endpoints based on the quantity of disconnected endpoints in each of the plurality of the mapped zones.

7. One or more non-transitory computer-readable media embodying logic that, when executed by a processor, is configured to perform operations comprising:
    sampling a plurality of endpoints included in a plurality of mapped zones associated with a base station, wherein sampling the plurality of endpoints includes polling a subset of the plurality of endpoints; and
    for each mapped zone of the plurality of mapped zones:
        determining a subset of disconnected endpoints, the disconnected endpoints being disconnected from a wireless network;
        estimating a PRACH load based on the subset of disconnected endpoints; and
        based on whether the estimated PRACH load is a pre-determined factor larger than an original PRACH allocation, increasing a PRACH allocation for accommodating reconnection of the subset of disconnected endpoints.

8. The non-transitory media of claim 7, wherein the logic is further configured to cause the processor to perform operations comprising, for each mapped zone of the plurality of mapped zones:
    reconnecting the subset of disconnected endpoints in; and
    reverting the PRACH allocation to the original PRACH allocation.

9. The non-transitory media of claim 7, wherein the mapped zones include time advancing zones.

10. The non-transitory media of claim 7, wherein the disconnected subset of endpoints are determined based at least in part on a primary synchronization signal and a secondary synchronization signal.

11. The non-transitory media of claim 7, wherein the PRACH allocation for accommodating reconnection of the subset of disconnected endpoints is based on a percentage of available PRACH preamble signatures.

12. The non-transitory media of claim 7, wherein the logic is further configured to cause the processor to perform operations comprising:
    determining the subset of disconnected endpoints in a plurality of the mapped zones; and
    prioritizing the reconnection of the subset of disconnected endpoints based on the quantity of disconnected endpoints in each of the plurality of the mapped zones.

13. A base station for wireless communication comprising:
    a memory;
    a processor coupled to a memory, the processor configured to:
        sample a plurality of endpoints included in a plurality of mapped zones associated with a base station, wherein sampling the plurality of endpoints includes polling a subset of the plurality of endpoints; and
        for each mapped zone of the plurality of mapped zones:
            determine a subset of disconnected endpoints, the disconnected endpoints being disconnected from a wireless network;
            estimate a PRACH load based on the subset of disconnected endpoints; and based on whether the estimated PRACH load is a predetermined factor larger than an original PRACH allocation, increase a PRACH allocation for accommodating reconnection of the subset of disconnected endpoints.

14. The base station of claim 13, wherein the processor is further configured to, for each mapped zone of the plurality of mapped zones:
   reconnect the subset of disconnected endpoints; and
   revert the PRACH allocation to the original PRACH allocation.

15. The base station of claim 13, wherein the mapped zones include time advancing zones.

16. The base station of claim 13, wherein the disconnected subset of endpoints are determined based at least in part on a primary synchronization signal and a secondary synchronization signal.

17. The base station of claim 13, wherein the PRACH allocation is for accommodating reconnection of the subset of disconnected endpoints is based on a percentage of available PRACH preamble signatures.

18. The base station of claim 13, wherein the processor is further configured to:
   determine the subset of disconnected endpoints in a plurality of the mapped zones; and
   prioritize the reconnection of the subset of disconnected endpoints based on the quantity of disconnected endpoints in each of the plurality of the mapped zones.

* * * * *